Figure 1:
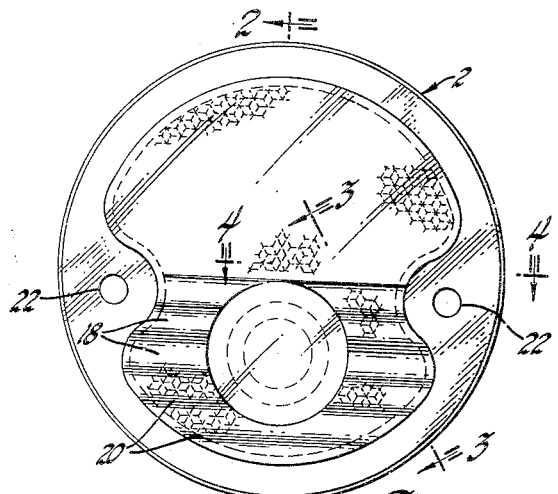

Aug. 3, 1954

G. W. ONKSEN 2,685,231

COMBINATION REFLECTOR AND TAILLIGHT LENS

Filed Dec. 8, 1949

Inventor
George W. Onksen
By
Willits, Helmig & Baillio
Attorneys

Patented Aug. 3, 1954

2,685,231

UNITED STATES PATENT OFFICE 2,685,231

COMBINATION REFLECTOR AND TAILLIGHT LENS

George W. Onksen, Anderson, Ind., assignor to General Motors Corporation, Detroit, Mich., a corporation of Delaware Application December 8, 1949, Serial No. 131,767

7 Claims. (Cl. 88—81)

The present invention relates to light reflectors and more particularly to light reflecting devices adapted to reflect light impinging thereon back along a path substantially in the direction of the light source.

A reflecting device which is well-known and has been used extensively heretofore as a signaling device comprises a matrix of contiguous similarly oriented cube corner reflecting units consisting of three substantially plane surfaces in the form of squares arranged to intersect at a common point with the adjacent surfaces at right angles to each other and with the axis of the reflecting device parallel to the diagonal axis of the reflecting units.

It is a characteristic of such a reflecting device that a ray of light incident on one of the surfaces of the cube corner unit is reflected from surface to surface about the diagonal axis of the unit and back along a path substantially parallel with the incident ray. Because of this characteristic reflection signaling devices comprising a matrix of cube corner reflecting units have been used extensively as warning signal devices on automotive vehicles, stationary highway markers and temporary highway obstructions. Such devices are not entirely satisfactory, however, where the source of light and the position of an observer's eye are substantially displaced laterally from the axis of the signaling device because of insufficient angular displacement between the path of an incident ray and the path of a reflected ray. Such a condition occurs, for example, in trucking vehicles and busses where the cab structure and consequently the position of the operator's eye is raised considerably above the level of the headlamps of the vehicle.

Accordingly, it is an object of the present invention to provide a reflecting device particularly suitable as a warning device for all types of automotive vehicles.

This and other objects are attained in accordance with the present invention by providing a reflecting device with means for returning rays of light incident thereon back along a path substantially angularly displaced from the path of the incident rays.

In accordance with my invention I have found that a warning signal device which is particularly satisfactory comprises a plate or disk of transparent material having formed on one side of the plate a matrix of contiguous cube corner reflecting units and on the other side a plurality of adjacent parallel curved flutes capable of bending the light reflected from the cube corner units to return it along a path substantially angularly displaced from the path of its incidence.

Figure 3:
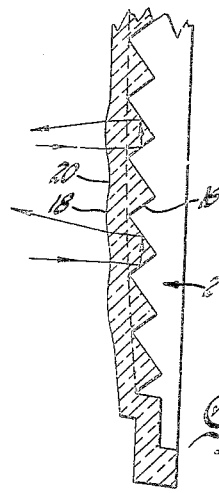
Figure 4:
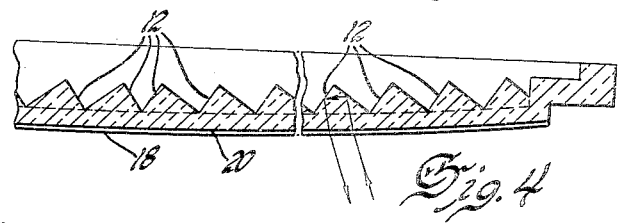
Figure 5:
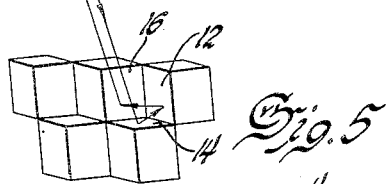
Figure 2:
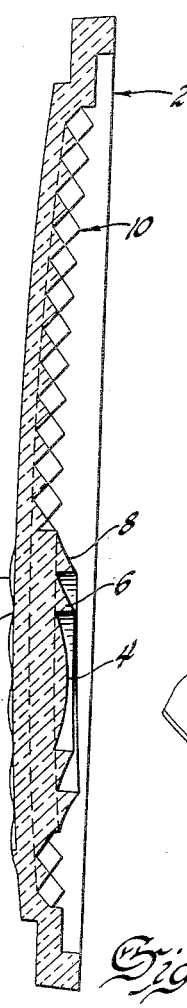
Figure 6:
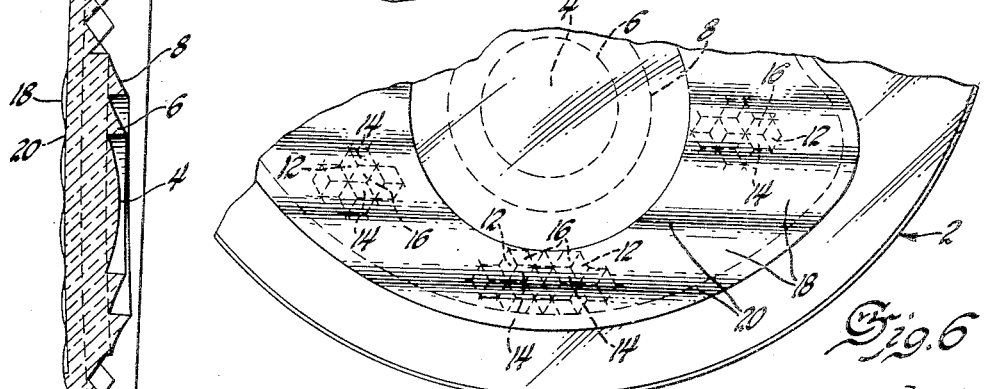

For a better understanding of my invention, reference may be had to the accompanying drawing in which Figure 1 is a front elevation of a combined tail light lens and light reflector embodying the present invention; Figure 2 is an enlarged view taken along the line 2—2 of Figure 1; Figure 3 is an enlarged fragmentary view taken along the line 3—3 of Figure 1; Figure 4 is an enlarged fragmentary view taken along the line 4—4 of Figure 1; Figure 5 is an enlarged perspective view of a cluster of the cube corner reflecting units forming the reflecting surface of the device; Figure 6 is an enlarged fragmentary view similar to Figure 1.

Referring now to the drawing there is illustrated a combined tail light lens and reflecting signal device comprising a generally concavo-convex disk-shaped member 2 of colored transparent material such, for example, as glass or the transparent polymerized methyl-methacrylate thermoplastic resin commonly known as "Lucite."

Formed on the inner or concave surface of the disk 2 is a light transmitting and collimating surface area comprising the spherical dioptric surface 4 and the surrounding dioptric concentric rings 6 and 8, respectively. Disposed around the light transmitting and collimating area and over substantially the remaining inner or concave surface area of disk 2 is a matrix of contiguous cube corner retro-reflecting units 10 consisting of adjacent square surfaces 12, 14 and 16, Figures 5 and 6, intersecting at a common point and capable of returning a light ray along a path substantially parallel to an incident ray, see Figure 5. The cube corner retro-reflecting units 10 are formed on the inner or concave surface of the disk 2 with the diagonal axes of the units parallel with the axis of the disk and are oriented in two groups on opposite sides of the vertical axis of the disk 2 coinciding with the line 2—2 of Figure 1 to provide a maximum range of angular inclination for the reception and total reflection of light on opposite sides of the vertical axis as disclosed in the Stimson Patent 2,205,638 dated June 25, 1940. With this orientation the reflector device has one group of reflecting units with an axis of maximum angular inclination inclined to the right on the horizontal axis and the other group with an axis of maximum angular inclination inclined to the left on the horizontal axis. Such a grouping of oppositely oriented reflecting units provides for maximum interception and reflection of light moving laterally along a plane passing through the horizontal axis of the disk.

To provide for the return of reflected light along a path angularly disposed to the incident rays, thus enabling an operator of a vehicle whose position is raised considerably above the level of the headlamps of the vehicle to see the reflected light signal, the outer or convex surface of the disk 2 has formed on its lower portion a plurality of alternately spaced parallel convex and concave flutes 18 and 20 respectively. The flutes 18 and 20 extend horizontally across substantially all of the lower half of the disk 2 except the light transmitting and collimating area coinciding with the spherical button 4 and the dioptric rings 6 and 8. The disk 2 is provided with attaching holes 22 located in alignment with the longitudinal axis of the horizontal flutes so that the flutes 18 and 20 when the disk 2 is attached to the tail lamp housing of a vehicle have their longitudinal axes substantially parallel with the horizontal axis of the vehicle. By alignment of the longitudinal axis of the flutes with the horizontal axis of the vehicle the plane of angular displacement between the incident and reflected rays is substantially parallel with the vertical axis of the vehicle. To provide a reflected signal from the device observable to the operator of a following vehicle in such instances where the operator's position is considerably displaced horizontally from the vertical axis of the reflecting device, it is desirable to angularly displace the flutes with respect to the horizontal axis of the vehicle. This may be accomplished, for example, by an alignment of the attaching holes 22 at an angle with respect to the longitudinal axis of the flutes. With a device such as I have described a combined tail light lens and reflector is provided with adjacent reflecting areas of substantially different angular displacement between incident and reflected rays thereby providing reflecting signal areas capable of returning a light signal to operators of substantially all types of vehicles.

To provide the flute covered reflecting area with suitable reflection intensity, the flutes are formed on a radius of curvature adapted to return light from any one of the cube corner reflecting units in a beam having an angular spread along an axis perpendicular to the longitudinal axes of the flutes of from about 1 to 8 degrees. In the preferred form of the reflecting device of my invention, optimum reflection intensity is obtained with a flute covered area having flutes formed on a radius of curvature adapted to return light in a beam having an angular spread along the axis perpendicular to the longitudinal axes of the flutes of 4 degrees. In its preferred form, as shown, the reflecting device is provided with a matrix of cube corner reflecting units 10 having a dimension of .125 inch between parallel cube corner aperture sides and flutes formed on a radius of curvature of .875 inch. With flutes having such a radius of curvature the alternating convex and concave flutes merge to provide a cross-sectional appearance of a continuous sine wave, each complete wave being .5 inch in width and each half wave being .25 inch in width. Consequently each flute has a width adapted to exactly bridge two adjacent cube corner apertures of .125 inch between parallel aperture sides. In this connection I have found that for optimum reflection intensity it is desirable that the ratio of flute curvature radius and cube corner aperture width be about 7 to 1.

As shown in Figure 6, in any one cluster of eight cube corner units having the hexagonal configuration, the overall vertical width between parallel sides of two adjacent cube corner units corresponds to the width of the flute while the horizontally spaced adjacent units have half of two vertically adjacent units covered by each flute.

A reflecting device of the type such as I have described is particularly desirable in that it provides a reflected signal to operators of passenger vehicles from the upper reflecting area and a reflected signal from the lower or flute covered area observable to operators of trucking vehicles whose operating position in the cab of the vehicle is substantially above that of passenger vehicle operators.

While I have shown and described one embodiment of the present invention, it is to be understood that other forms may be adopted, all coming within the scope of the claims which follow.

What I claim as new and desire to secure by Letters Patent of the United States is:

1. A reflection signaling device comprising a plate of transparent material having disposed on the rear surface thereof a plurality of contiguous retro-reflecting units, each of said units comprising a plurality of reflecting surfaces arranged with adjacent surfaces angularly displaced and meeting at a common point, and a plurality of flutes with curved surfaces disposed in parallel on the front surface of said plate, said curved surfaces cooperating with said retro-reflecting units to spread the light reflected from said units a predetermined amount.

2. A reflection signaling device comprising a plate of transparent material having disposed on the rear surface thereof a plurality of contiguous cube corner retro-reflecting units, each of said units consisting of a plurality of reflecting surfaces substantially at right angles to each other and meeting at a common point, and a plurality of flutes with curved surfaces disposed in parallel on the front surfaces of said plate, said curved surfaces cooperating with said cube corner retro-reflecting units to spread the light reflected from said units a predetermined amount.

3. A reflection signaling device comprising a plate of transparent material having disposed on the rear surface thereof a plurality of contiguous cube corner retro-reflecting units, each of said units consisting of a plurality of reflecting surfaces substantially at right angles to each other and meeting at a common point, and a plurality of parallel convex and concave flutes alternately arranged on the other side of said plate, said flutes cooperating with said cube corner retro-reflecting units to spread the light reflected from said units a predetermined amount.

4. A reflection signaling device for use on automotive vehicles comprising a plate of transparent material having disposed on the rear side thereof a plurality of contiguous retro-reflecting units, each of said units comprising a plurality of reflecting surfaces arranged with adjacent surfaces angularly displaced and meeting at a common point, a plurality of parallel flutes with curved surfaces on one portion of the front side of said plate, a second portion on the front side of said plate having a plane surface, said plane surface cooperating with said retro-reflecting units to direct the light reflected from said units back to its source and said curved surfaces cooperating with said retro-reflecting units to spread the light reflected from said units a predetermined amount.

5. A reflection signaling device comprising a plate of transparent material having disposed on the rear surface thereof a plurality of contiguous cube corner retro-reflecting units, each of said units consisting of a series of square reflecting surfaces arranged with adjacent surfaces angularly displaced by 90 degrees and intersecting at a common point, said units having their diagonal axes substantially parallel to the axis of the plate thereby defining hexagonal light reflecting apertures in said plate, and a plurality of parallel flutes with curved surfaces on the front surface of said plate, each of said flutes having a radius of curvature substantially seven times greater than the dimension of the hexagonal aperture width of said cube corner reflecting units measured between parallel sides of one of said hexagonal apertures, said flutes cooperating with said retro-reflecting units to spread the light reflected from said units a predetermined amount.

6. A reflection signaling device comprising a plate of transparent material having disposed on the rear surface thereof a plurality of contiguous retro-reflecting units, each of said units comprising a plurality of reflecting surfaces arranged with adjacent surfaces angularly displaced and meeting at a common point, and a plurality of parallel flutes with curved surfaces on the front surface of said plate, said curved surfaces cooperating with said retro-reflecting units to spread the light reflected from said units about from 1 to 8 degrees to the incident beam of light entering said curved surfaces.

7. A combined tail light lens and reflection signaling device for automotive vehicles comprising a plate of transparent material having a light transmitting and collimating portion and a light reflecting portion, said light reflecting portion having disposed on the rear surface thereof a plurality of contiguous cube corner retro-reflecting units, each of said units consisting of a plurality of reflecting surfaces substantially at right angles to each other and meeting at a common point, and a plurality of flutes with curved surfaces disposed in parallel on the front surface thereof, said curved surfaces cooperating with said cube corner retro-reflecting units to spread the light reflected from said units a predetermined amount.

References Cited in the file of this patent

UNITED STATES PATENTS

| Number | Name | Date |
|---|---|---|
| 1,123,969 | Wiley | Jan. 5, 1915 |
| 1,689,911 | Broughton | Oct. 30, 1928 |
| 1,896,887 | Falge | Feb. 7, 1933 |
| 2,012,933 | Davidson | Aug. 27, 1935 |
| 2,086,388 | Nechin | July 6, 1937 |
| 2,113,553 | Dover | Apr. 5, 1938 |
| 2,205,638 | Stimson | June 25, 1940 |
| 2,250,620 | Bone | July 29, 1941 |
| 2,287,191 | Morehead | June 23, 1942 |

FOREIGN PATENTS

| Number | Country | Date |
|---|---|---|
| 608,044 | France | Apr. 10, 1926 |